Figure 1:
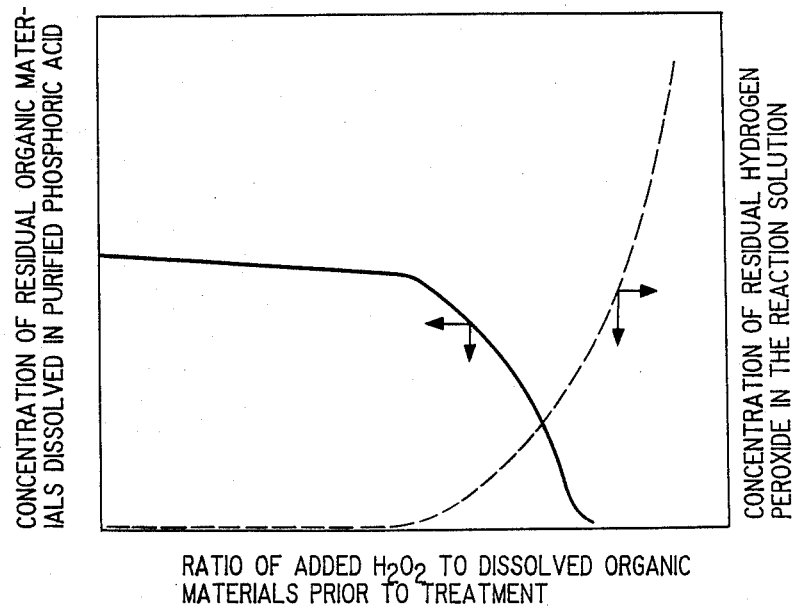

United States Patent [19]

Nakatani

[11] Patent Number: 4,820,501

[45] Date of Patent: Apr. 11, 1989

[54] METHOD FOR REMOVING ORGANIC MATERIALS DISSOLVED IN PURIFIED PHOSPHORIC ACID

[75] Inventor: Masaki Nakatani, Tokuyama, Japan

[73] Assignee: Tosoh Corporation, Shin-nanyo, Japan

[21] Appl. No.: 162,123

[22] Filed: Feb. 29, 1988

[30] Foreign Application Priority Data

Mar. 9, 1987 [JP] Japan ................................ 62-52142

[51] Int. Cl.$^4$ .............................................. C01B 25/16
[52] U.S. Cl. .............................. 423/321 R; 423/321 S
[58] Field of Search ......................... 423/321 R, 321 S

[56] References Cited

U.S. PATENT DOCUMENTS

| 4,330,516 | 5/1982 | Winand | 423/321 S |
| 4,637,922 | 1/1987 | Nakatani et al. | 423/321 R |
| 4,643,883 | 2/1987 | Barchort | 423/321 S |

FOREIGN PATENT DOCUMENTS

| 71797 | 2/1982 | European Pat. Off. . |
| 80372 | 1/1983 | European Pat. Off. . |
| 3022662 | 1/1982 | Fed. Rep. of Germany ... 423/321 R |
| 1504480 | 3/1978 | United Kingdom . |

OTHER PUBLICATIONS

Derwent Abstract, 17696, 1983.

Primary Examiner—Gregory A. Heller
Attorney, Agent, or Firm—Oblon, Fisher, Spivak, McClelland & Maier

[57] ABSTRACT

A method for removing organic materials dissolved in purified phosphoric acid by decomposing it with hydrogen peroxide, characterized in that after the treatment with hydrogen peroxide, the purified phosphoric acid is contacted with reducing phosphorus compounds.

8 Claims, 2 Drawing Sheets

METHOD FOR REMOVING ORGANIC MATERIALS DISSOLVED IN PURIFIED PHOSPHORIC ACID

The present invention relates to a method for purifying purified phosphoric acid i.e. purified phosphoric acid obtained by preliminarily removing, by a conventional purification technique such as a solvent extraction method or a solvent precipitation method, impurities from wet process phosphoric acid obtained by a so-called wet process wherein a phosphate rock is decomposed by mineral acids or preliminarily purified phosphoric acid such as furnace process phosphoric acid obtained by oxidizing and hydrating white phosphorus obtained by reducing a phosphate rock in an electric furnace (hereinafter referred to simply as purified phosphoric acid) to obtain highly pure purified phosphoric acid for industrial use or for use as a food additive. More particularly, the present invention relates to a method for removing organic materials dissolved in such purified phosphoric acid by subjecting it to oxidation treatment with hydrogen peroxide.

Such purified phosphoric acid as mentioned above contains organic materials derived from phosphate rock as the starting material or organic materials added during the purification step. Such organic materials are likely to undergo coloring when the purified phosphoric acid is heated for e.g. concentration, or they are likely to create a coloring problem at the time of preparation of phosphates from the phosphoric acid and thus lead to contamination of the product. Therefore, it is desired to completely remove organic materials dissolved in the purified phosphoric acid.

As a method for removing organic materials dissolved in phosphoric acid including such purified phosphoric acid, it has been proposed to remove organic materials by contacting it with hydrogen peroxide, for example, in Japanese Unexamined Patent Publication No. 99108/1983 and Japanese Examined Patent Publication Nos. 19045/1984, 49122/1985 and 12846/1986.

It is an object of the present invention to substantially completely remove organic materials dissolved in the purified phosphoric acid and to establish a method for producing purified phosphoric acid of a high purity, which is economically feasible for industrial application. As a technique for the removal of organic materials, the oxidation decomposition method by means of hydrogen peroxide is most suitable in every aspect. In the course of the research for its application, the present inventor has encountered serious problems.

Firstly, foaming takes place in the product phosphoric acid very gradually over a long period of time, and when $H_3PO_4$ is above 80% by weight, the higher the phosphoric acid concentration is, the more difficultly turbidity due to air bubbles tends to disappear. Secondly, when this hydrogen peroxide treatment is followed by treatment with a hydrogen sulfide for the removal of heavy metals, very fine precipitates form which can not be removed by usual industrial precoat filtration. Such fine precipitates pass through the filtering cloth and thus lead to a turbidity phenomenon of the product and clogging of the filter cloth of the filtering apparatus, whereby the productivity deteriorates substantially. These phenomena have not been expected heretofore.

As a result of the analysis of these phenomena, it has been found that hydrogen peroxide used as oxidizing agent remains at a very low concentration without decomposition, and such residual hydrogen peroxide is the main cause.

In order to avoid such residual hydrogen peroxide, if the amount of the addition of hydrogen peroxide is reduced not to permit non-decomposed hydrogen peroxide to remain, the above-mentioned problems can certainly be eliminated. However, residual organic materials in purified phosphoric acid will then increase, whereby it will be impossible to completely decompose the organic materials. Accordingly, in order to completely decompose the dissolved organic materials as initially intended, it can not be helped that non-decomposed hydrogen peroxide is permitted to remain. In short, unless nascent oxygen is present substantially in excess during the oxidation reaction, the decomposition of the organic materials will be inadequate.

An object of the present invention is to provide a method for removing non-decomposed hydrogen peroxide used in the removal of organic material dissolved in the purified phosphoric acid.

The present invention provides a method for removing organic materials dissolved in purified phosphoric acid by decomposing it with hydrogen peroxide, characterized in that after the treatment with hydrogen peroxide, the purified phosphoric acid is contacted with reducing phosphorus compounds.

Now, the present invention will be described in detail with reference to the preferred embodiments.

In the accompanying drawings, FIG. 1 is a graph showing the relation between the amount of hydrogen peroxide during the oxidation treatment of purified phosphoric acid by means of hydrogen peroxide, and the removal of organic materials and the residual hydrogen peroxide concentration.

Figure 2:
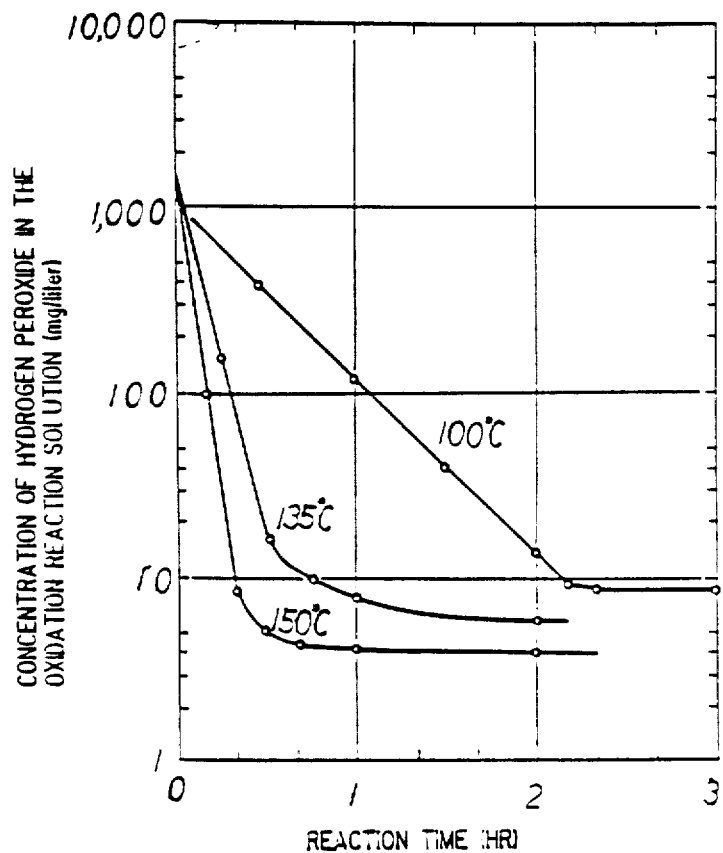

FIG. 2 is a graph showing the decomposition state of hydrogen peroxide during the thermal decomposition.

The present invention is directed to decompose and remove residual hydrogen peroxide by contacting the purified phosphoric acid treated by hydrogen peroxide, with reducing phosphorus cmmpounds.

In this specification, "reducing phosphorus compounds" mean substances which produce $H_3PO_4$ when oxidized in the presence of water. The conditions for decomposing dissolved organic materials with hydrogen peroxide include the phosphoric acid concentration, the temperature, the time and the amount of hydrogen peroxide for the oxidation reaction. In order to conduct the removal of organic materials dissolved in the purified phosphoric acid effectively, the higher the concentration of the phosphoric acid, the better, since the decomposition rate of the organic materials is thereby high. Specifically, the concentration is preferably at least 85% by weight as $H_3PO_4$. Likewise, the higher the temperature of the oxidation reaction, the higher the decomoosition rate of the dissolved organic materials. Practically, the temperature is at least 100° C. The higher the temperature, the more advantageous. In view of the restriction of the material of the apparatus, however, the upper limit is usually at a level of 150° C. Accordingly, the temperature is preferably from 120° to 150° C. The amount of hydrogen peroxide to be added can not be generally defined, since it varies widely depending upon the type of the phosphate rock used as the starting material for the preparation of wet process phosphoric acid or the method used for the purification of the wet process phosphoric acid. However, hydrogen peroxide is usually added in an amount of 0.0005 to 0.05 time by weight as $H_2O_2$ relative to $H_3PO_4$ in the purified phosphoric acid. FIG. 1 diagrammatically illustrates experimental results showing the relation between the amount of hydrogen peroxide and the concentration of the residual organic material. The ordinate indicates the concentration of the residual organic materials by a solid line and the concentration of the residual hydrogen peroxide by a dotted line, while the abscissa indicates the ratio of the amount of the added hydrogen peroxide to the amount of the dissolved organic materials prior to the treatment. From FIG. 1, it is evident that in order to completely decompose the dissolved organic materials, the presence of the residual hydrogen peroxide is necessary. In other words, it is evident that hydrogen peroxide should be added substantially in excess. Accordingly, it is evident that in order to accomplish the object of the present invention, it is important to control two reactions i.e. the reaction for decomposing dissolved organic materials in the oxidation step with hydrogen peroxide and the reaction for decomposing the residual hydrogen peroxide. Under the circumstances, the present inventor has conducted research to minimize the amount of hydrogen peroxide to be added, to conduct the reaction at a mild reaction temperature, to minimize the residual hydrogen peroxide and to decompose the residual hydrogen peroxide.

The thermal decomposition of hydrogen peroxide is usually regarded as a first-order reaction. It is a first-order reaction also in a phosphoric acid solution, and the decomposition rate is governed by the concentration of phosphoric acid and the reaction temperature. The higher the concentration of phosphoric acid and the higher the reaction temperature, the higher the decomposition rate.

However, it has been found that an abnormal phenomenon occurs during the decomposition of hydrogen peroxide in the purified phosphoric acid.

Namely, when the decomposition of hydrogen peroxide was investigated at a phosphoric acid concentration of at least 85 at a reaction temperature of at least 100° C., it was found that the decomposition rate became extremely low when the concentration of hydrogen peroxide in the solution reached a certain specific level, specifically a level of not higher than 10 mg/liter, and accordingly it was very difficult to completely decompose hydrogen peroxide under the usual conditions. This phenomenon was found to be the main cause of to the above-mentioned problems.

The results will be described in further detail with reference to the drawings.

FIG. 2 shows the change in the concentration of hydrogen peroxide in the purified phosphoric acid i.e. the decomposition state. The ordinate indicates the concentration of hydrogen peroxide, and the abscissa indicates the reaction time. The reaction temperature was varied at levels of 100° C., 135° C. and 150° C. As is evident from FIG. 2, the higher the reaction temperature, the greater the change in the concentration of hydrogen peroxide i.e. the higher the decomposition rate. However, at any temperature level, when the hydrogen peroxide concentration in the reaction solution drops to a level of not higher than 10 mg/liter, the decomposition rate abruptly lowers to a level of about 1/10 as compared with the initial decomposition rate. The same phenomenon appear even at a high temperature of 150° C. which is the practical limit in view of the material of the apparatus. Therefore, if hydrogen peroxide is to be completely decomposed solely by controlling the temperature condition, it will be required to conduct the treatment at a practically infeasibly high temperature for a long period of time, which is disadvantageous from the economical view point including energy saving and which brings about a demerit such as a reduction in the productivity.

Here, the reason why the decomposition rate abruptly drops when the hydrogen peroxide concentration in the purified phosphoric acid becomes to a level of not higher than 10 mg/liter, is not clearly understood. However, a part of phosphoric acid changes to condensed phosphates at the temperature for the treatment with hydrogen peroxide, and the condensed phosphates are considered to serve as a stabilizer for hydrogen peroxide. (This is assumed based on the fact that condensed phosphates are a stabilizer for hydrogen peroxide.)

As is evident from the foregoing description, according to a preferred embodiment of the present invention, the purified phosphoric acid is reacted with hydrogen peroxide at a phosphoric acid concentration of at least 85% by weight as $H_3PO_4$ at a reaction temperature of at least 100° C., preferably from 130° to 150° C., and then reacted with reducing phosphorus compounds when the hydrogen peroxide concentration in the reaction solution has been reduced to a level of not higher than 10 mg/liter, whereby all of the dissolved organic materials and all of the residual hydrogen peroxide can be completely decomposed and removed by a relatively small amount of the reducing phosphorus compounds.

In order to remove a very small amount of residual oxidizing agents, it is usually most simple to employ a thermal decomposition method. However, in the treatment of purified phosphoric acid, it is necessary to employ a high temperature substantially exceeding 150° C., as mentioned above, and there is no feasible material practically available for such a high temperature. On the other hand, there is a method wherein a noble metal such as platinum is used as a catalyst. However, such a method requires filtration and separation and involves a problem of contamination of the product. Further, optical decomposition methods are conceivable, but there are problems that the industrial apparatus for ultra violet rays or X-rays are expensive. Therefore, the present invention using reducing agents is more economical as compared with such methods. However, as the reducing agents, not all of the usual reducing agents can be used. The present inventor has searched for various reducing agents which satisfy the following requirements for the treatment of the purified phosphoric acid. Here, the requirements for such reducing agents are as follows:

(a) Not to reduce the purity of purified phosphoric acid.

(b) Not to require after-treatment.

(c) Not to require special materials.

(d) To have a short reaction time (so that the apparatus may be made compact).

The above requirements are essential to accomplish the object of the present invention i.e. a method for the production of purified phosphoric acid of a high purity, which is simple and economically feasible for an industrial application. In addition to the discovery of the technical problem and the use of reducing agents, an additional feature of the process of the present invention resides in the discovery of reducing phosphorus compounds as reducing agents which satisfies the above requirements. The reducing phosphorus compounds includes elemental phosphorus such as white phosphorus or red phosphorus; phosphorus hydrides such as $PH_3$ or $P_2H_4$; and a lower oxyacid of phosphorus such as hypophosphorous acid, (ortho-, meta- or pyro-)phosphorous acids or hypophosphoric acid. It is particularly preferred to use hypophosphorous acid and ortho-phosphorous acid alone or in combination as a mixture, since they are easy to handle. The residual hydrogen peroxide can be completely decomposed by such reducing agents, whereby a level of not higher than 0.1 ppm can be accomplished. The added reducing agents are advantageously oxidized to ortho-phosphoric acid, whereby there will be no trouble of the residual additive.

Now, the operation of the process of the present invention will be described in further detail.

Firstly, there is no particular restriction as to the method for decomposing hydrogen peroxide with the reducing phosphorus compounds, and a batch method or a continuous method may be employed. For the industrial purpose, a continuous method is effective.

The reducing phosphorus compounds to be added may be a single compound or a mixture of a plurality of compounds. From the view point of the operational control, use of a single compound is preferred. As to the timing for the addition, it is preferred to add the reducing phosphorus compounds at the time when the hydrogen peroxide concentration in the reaction solution has reached to a level of not higher than 10 mg/liter as a feature of the present invention. If the addition is made at a time when the concentration is higher than this level, a larger amount of the reducing phosphorus compounds will be required to completely remove hydrogen peroxide.

Among the reaction conditions for reduction, the next important is the amount of the reducing phosphorus compounds to be added. In order to completely remove the residual hydrogen peroxide, it is necessary to use the reducing phosphorus compounds in an amount of at least stoichiometric to the residual hydrogen peroxide. However, as described hereinafter, it is not necessary to use more than 20 equivalents. It is preferred to use it in an amount of from 2 to 10 equivalents. Even if the reducing phosphorus compounds are used in excess in such a manner, the excess reducing phosphorus compounds will either remain in a gas phase or decompose into $H_3PO_4$ and a gas which does not dissolve in purified phosphoric acid. Thus, it does not remain as dissolved in the purified phosphoric acid. For instance, a gaseous phosphorus hydride such as $PH_3$ has an extremely small solubility, and a portion thereof which reacts with $H_2O_2$ will be absorbed, but the rest will remain in the gas phase. Any excess amount of elemental phosphorus will react with water to form $H_2$, $H_3PO_4$ and $PH_3$. Likewise, the lower oxyacid of phosphorus will be converted to $PH_3$ and $H_3PO_4$. Such $PH_3$ or $H_2$ in the gas phase can readily be separated from the purified phosphoric acid. However, it is not only uneconomical but also totally meaningless to add too much i.e. exceeding 20 equivalents relative to the residual hydrogen peroxide.

On the other hand, the reaction temperature is preferably at least 80° C. with any reducing agent. Particularly, preferred is a temperature of from 100° to 150° C., whereby the reaction can be completed within 15 minutes, and it is possible to make the installation compact, such being particularly advantageous.

As to the type of the reaction apparatus, an agitation type, a tubler type or a tower type may be used.

The process of the present invention as described above provides the following excellent effects.

(1) Organic materials dissolved in purified phosphoric acid can be completely decomposed and yet the oxidizing agents used for the decomposition of the organic materials can be made not to remain at all. Thus, it is possible to produce purified phosphoric acid having a high purity at a level of the special grade under JIS and essentially qualified as a food additive. Further, it is possible to eliminate foaming of the product during its production and to eliminate the influence of the residual oxidizing agents in the subsequent steps.

(2) The step of reduction treatment is simple and can be completed in a short period of time. Thus, the process is very economical.

(3) The reducing agents added will be all oxidized to ortho-phosphoric acid, which is desirable from both the quality and economical view points.

(4) The reaction does not require any special high temperature condition, and no special materials will be required.

Thus, it is a process for the production of purified phosphoric acid of a high purity, which is economically feasible for industrial application.

Now, the present invention will be described in further detail with reference to Examples. However, it should be understood that the present invention is by no means restricted to such specific Examples. In the Examples, "%" means "% by weight", and the content of organic materials is represented by the amount of carbon and likewise heavy metals were represented by lead.

EXAMPLE 1

Phosphate rock produced in Morocco was decomposed with sulfuric acid, and then gypsum was separated to obtain a wet process phosphoric acid having the following composition:

$P_2O_5$: 33%
$SO_4$: 1.0%
Fe: 0.1%
Organic materials: 350 ppm

To the above wet process phosphoric acid, powdery active carbon (manufactured by TAIHEI Kagakusangyo K.K.) was added in an amount of 3 g (75% as active carbon) per 1 kg of $P_2O_5$, and the mixture was treated at room temperature and then subjected to filtration. The filtrate was subjected to multi-stage extraction with n-butanol. The solvent layer thus obtained was back-extracted with water to obtain a dilute purified phosphoric acid, which was concentrated under reduced pressure to obtain purified phosphoric acid having the following composition:

$H_3PO_4$: 92%
Organic materials: 10 ppm
Heavy metal: 10 ppm

Then, 1000 g of hhe concentrated purified phosphoric acid was put into a 1 liter glass reactor equipped with a stirrer and heated to 135° C. in an oil bath. Then, 7 ml of a 35% hydrogen peroxide aqueous solution was added thereto, and the mixture was reacted for one hour, whereupon the oxidation purified phosphoric acid had the following composition:

$H_3PO_4$: 92%
Organic materials: Trace
$H_2O_2$: 9 mg/liter
Heavy metal: 10 ppm Then, 250 g of the oxidation purified phosphoric acid was charged into a 500 ml reactor equipped with a stirrer and heated to 120° C. in an oil bath. Then, reagent grade hypophosphorous acid (50%) was diluted with pure water to obtain a 5% aqueous souution, which was added in an amount of 0.4 ml to the reactor. The mixture was heat-treated for 15 minutes. The concentration of hydrogen peroxide in the solution after the reaction was less than 0.1 mg/liter, which was the detection limit of the quantitative analysis.

The solution was left to stand at room temperature for one day and night, whereupon any turbidity for foaming was not observed at all in the product.

Further, into 200 g of the solution, $H_2S$ gas was blown at room temperature for 10 minutes for heavy metal treatment, whereby yellow sulfide precipitates were formed. This slurry was filtered by means of a glass filter precoated with diatomaceous earth, whereby colorless transparent purified phosphoric acid was recovered with a heav metal content of less than 0.1 ppm.

COMPARATIVE EXAMPLE

The oxidation purified phosphoric acid obtained by the treatment in Example 1 was used as a test solution. This solution was cooled to room temperature and left to stand for one day and night, whereby bubbles appeared in the glass vessel and turbidity was observed.

The concentration of hydrogen peroxide in the solution was as high as 6 mg/liter.

Then, 250 g of the solution was subjected to $H_2S$ treatment in the same manner as in Example 1 for the heavy metal treatment, followed by filtration. The filtrate had turbidity. The turbidity was found to be sulfur (S), and the heavy metal content in the purified phosphoric acid was 0.1 ppm.

EXAMPLE 2

Purified phosphoric acid obtained from imported white phosphorus as strating material, had the following composition:

$H_3PO_4$: 86%
Organic materials: 5 ppm
Heavy metal: 8 ppm

The purified phosphoric acid was treated in the same manner as in Example 1 except that the amount of a 35% hydrogen peroxide aqueous solution added in the step for the oxidation treatment wihh hydrogen peroxide in Example 1 was changed to 5 ml, to obtain oxidation purified phosphoric acid having the following composition:

$H_3PO_4$: 86%
Organic materials: Trace
$H_2O_2$: 8 mg/liter
Heavy metal: 8 ppm

Then, 250 g of the oxidation purified phosphoric acid was treated in the same manner as in Example 1 except that as the reducing agent in the reduction treatment step, 0.2 ml of a 5% ortho-phosphorous acid aqueous solution was used, whereby the hydrogen peroxide concentration after the reaction was less than 0.1 mg/liter, which was the detection limit of the quantitative analysis. Further, no turbidity was observed after the solution was left to stand for one day and night, and no turbidity was observed after the heavy metal treatment.

I claim:

1. A method for removing organic materials dissolved in phosphoric acid, which comprises the steps of:
   (i) decomposing said organic materials with hydrogen peroxide to obtain a purified phosphoric acid which contains residual hydrogen peroxide; and
   (ii) contacting said purified phosphoric acid with a reducing phosphorus compound which is at least one member selected from the group consisting of elemental phosphorus, phosphorus hydrides, and lower oxyacids of phosphorus, such that the amount of said reducing phosphorus compound is at least stoichiometric to said residual hydrogen peroxide and at a temperature of at least 80° C. to obtain a further purified phosphoric acid.

2. The method of claim 1, wherein said phosphorus hydride is one member selected from the group consisting of $PH_3$ and $P_2H_4$.

3. The method of claim 1, wherein said lower oxyacid of phosphorus is at least one member selected from the group consisting of hypophosphorous acid, ortho-phosphorous acid, meta-phosphorous acid, and pyro-phosphorous acid.

4. The method of claim 3, wherein said lower oxyacid of phosphorus is at least one member selected from the group consisting of hypophosphorous acid and ortho-phosphorous acid.

5. The method fo claim 1, wherein said amount of said reducing phosphorus compound is from 1 to 20 equivalents of said residual hydrogen perixide.

6. The method fo claim 5, wherein said amount of said reducing phosphorus compound is from 2 to 10 equivalents of said residual hydrogen peroxide.

7. The method of claim 1, wherein said contacting step is performed at a temperature of from 100° to 150° C.

8. The method of claim 1, wherein during said decomposing step, the amount of said residual hydrogen peroxide is reduced to less than 10 mg/liter.

* * * * *

UNITED STATES PATENT AND TRADEMARK OFFICE
CERTIFICATE OF CORRECTION

PATENT NO. : 4,820,501

DATED : April 11, 1989

INVENTOR(S) : Masaki Nakatani

It is certified that error appears in the above-identified patent and that said Letters Patent is hereby corrected as shown below:

In The Grant Only insert Figure 2 as shown on the attached sheet.

Signed and Sealed this

Sixteenth Day of January, 1990

*Attest:*

JEFFREY M. SAMUELS

*Attesting Officer*  *Acting Commissioner of Patents and Trademarks*